US012269395B2

(12) United States Patent
Yoshihara

(10) Patent No.: US 12,269,395 B2
(45) Date of Patent: Apr. 8, 2025

(54) DEVICE ATTACHMENT STRUCTURE

(71) Applicant: NIFCO INC., Yokosuka (JP)

(72) Inventor: Kazuki Yoshihara, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 18/288,299

(22) PCT Filed: Apr. 28, 2022

(86) PCT No.: PCT/JP2022/019279
§ 371 (c)(1),
(2) Date: Oct. 25, 2023

(87) PCT Pub. No.: WO2022/255019
PCT Pub. Date: Dec. 8, 2022

(65) Prior Publication Data
US 2024/0217449 A1 Jul. 4, 2024

(30) Foreign Application Priority Data
May 31, 2021 (JP) ................. 2021-091793

(51) Int. Cl.
*B60R 11/02* (2006.01)
*B60R 11/00* (2006.01)

(52) U.S. Cl.
CPC ....... *B60R 11/02* (2013.01); *B60R 2011/0026* (2013.01)

(58) Field of Classification Search
CPC . B60R 11/07; B60R 2011/0026; B60R 11/02; B60R 1/12; B60R 1/04; B60R 11/04
(Continued)

(56) References Cited

U.S. PATENT DOCUMENTS 8,770,644 B2 * 7/2014 Harders ................. B60R 11/00
296/214
10,974,660 B2 * 4/2021 Masui .................... B60R 11/04
(Continued)

FOREIGN PATENT DOCUMENTS

JP 2018-012406 A 1/2018
JP 2018-016296 A 2/2018
(Continued)

OTHER PUBLICATIONS

PCT/ISA/210, "International Search Report for PCT International Application No. PCT/JP2022/019279," Jun. 21, 2022.

*Primary Examiner* — Christopher Garft
*Assistant Examiner* — Michael McDuffie
(74) *Attorney, Agent, or Firm* — HAUPTMAN HAM, LLP

(57) ABSTRACT

A device attachment structure is attached to a vehicle inner side face of a window panel and includes a base member supporting a device, a bracket attached to a roof, and a first cover attached to the base member and the bracket. A fourth engagement portion is restrained by a first engagement portion from moving in a first direction and toward a first side in a third direction, and is allowed to move in a second direction and toward a second side in the third direction. A sixth engagement portion is restrained by a third engagement portion from moving in the first and third directions, and is allowed to move in the second direction. A fifth engagement portion is restrained by a second engagement portion from moving in the first and third directions, and is butted against the second engagement portion in the second direction by an urging member.

6 Claims, 7 Drawing Sheets

(58) Field of Classification Search
USPC ...... 248/309.1, 200, 686, 674, 200.1, 220.1, 248/310
See application file for complete search history.

(56) References Cited

U.S. PATENT DOCUMENTS

| | | | |
|---|---|---|---|
| 10,981,520 B1* | 4/2021 | Mutyala | B60R 11/04 |
| 11,097,691 B2* | 8/2021 | Kovach | B60R 11/04 |
| 11,117,528 B2* | 9/2021 | Okuda | B60R 11/04 |
| 11,148,612 B2* | 10/2021 | Ueta | G03B 17/561 |
| 11,150,448 B2* | 10/2021 | Furutake | H04N 23/73 |
| 11,230,233 B2* | 1/2022 | Takenouchi | B60R 11/04 |
| 11,237,461 B2* | 2/2022 | Kasai | H04N 23/51 |
| 11,338,742 B2* | 5/2022 | Inayoshi | B60R 11/04 |
| 11,851,008 B2* | 12/2023 | Miller | B60R 11/04 |
| 11,858,314 B2* | 1/2024 | Iwamoto | B60H 1/242 |
| 2016/0009230 A1* | 1/2016 | Miyado | B60R 11/04 224/482 |
| 2017/0240120 A1* | 8/2017 | Krug | F16M 13/02 |
| 2018/0154842 A1 | 6/2018 | Naoi | |
| 2019/0308563 A1 | 10/2019 | Fujiwara | |
| 2019/0375344 A1* | 12/2019 | Kobayashi | H04N 23/52 |
| 2020/0192189 A1 | 6/2020 | Kasai et al. | |
| 2022/0050363 A1 | 2/2022 | Tachibana | |
| 2024/0217449 A1* | 7/2024 | Yoshihara | B60R 11/02 |

FOREIGN PATENT DOCUMENTS

| | | |
|---|---|---|
| JP | 6494750 B2 | 3/2019 |
| JP | 2020-097332 A | 6/2020 |
| JP | 2020-121580 A | 8/2020 |
| JP | 2021-049916 A | 4/2021 |

\* cited by examiner

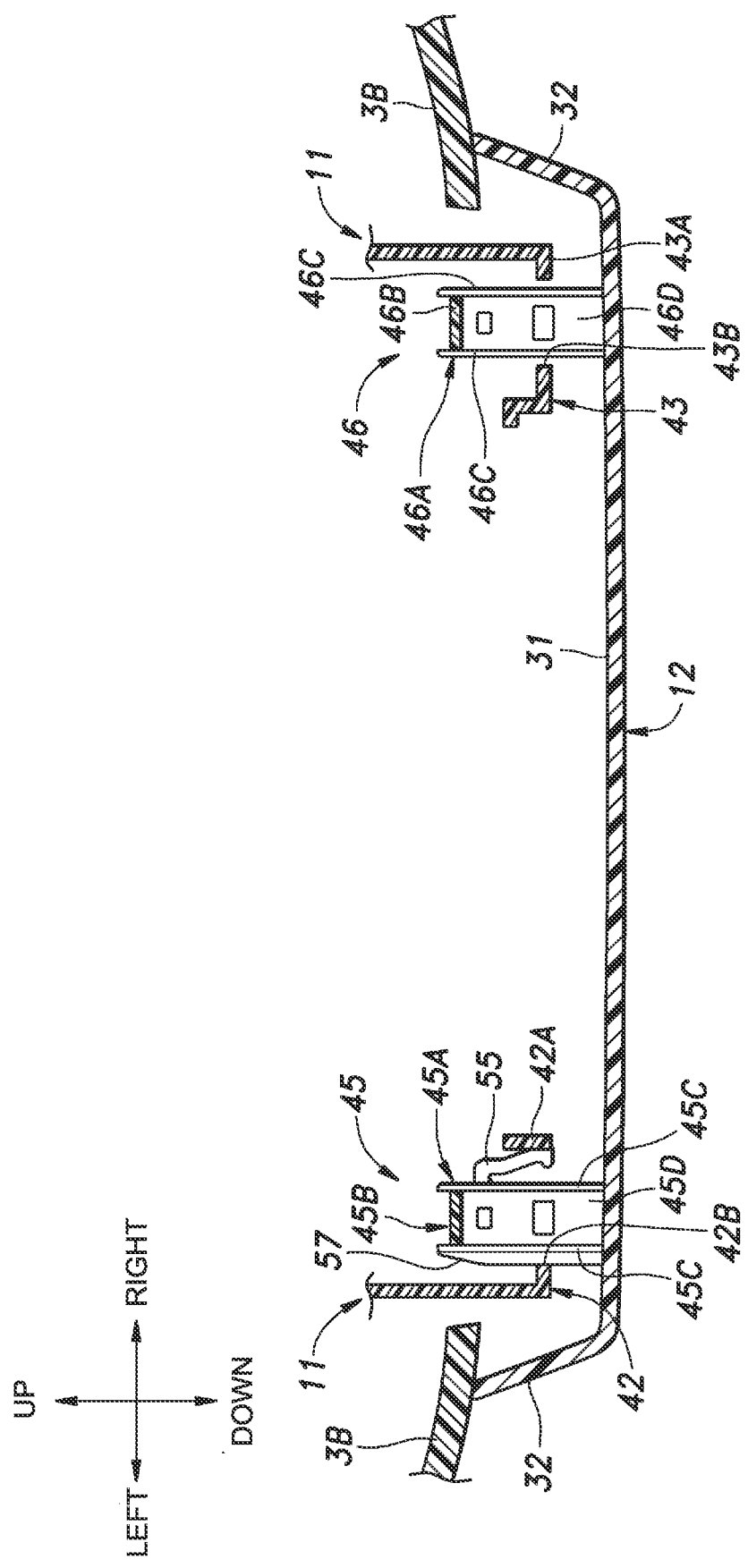

DEVICE ATTACHMENT STRUCTURE

RELATED APPLICATIONS

The present application is National Phase of International Application No. PCT/JP2022/019279 filed Apr. 28, 2022, and claims priority from Japanese Application No. 2021-091793, filed May 31, 2021, the disclosure of which is hereby incorporated by reference herein in its entirety.

TECHNICAL FIELD

The present invention relates to a device attachment structure provided at a boundary between a window panel and a roof of a vehicle.

BACKGROUND

Patent Document 1 discloses a device attachment structure that includes a base member attached to a window panel and supporting a sensor module such as a camera, and a cover connected to the base member and covering the base member and the sensor module. The cover is engaged with a plurality of portions including a front end portion and a rear end portion of the base member.

CITATION LIST

Patent Document

Patent Document 1: Japanese Patent No. 6494750

SUMMARY

Technical Problem

There is a request that a rear end of a cover reaches a roof in order to enhance designability. In this case, a rear portion of the cover is supported with the roof. When the cover is disposed over the base member and the roof, any misalignment in the relative positions of the base member and the roof makes it difficult to appropriately support the cover with the base member and the roof.

In view of the above-mentioned background, an object of the present invention is to provide a device attachment structure that is easy to attach to the base member and the roof.

Solution to Problem

To achieve the above object, one aspect of the present invention provides a device attachment structure (1) provided at a boundary between a window panel (2) and a roof (3) of a vehicle, wherein when an up-and-down direction is a first direction, a width direction of the window panel is a second direction, a direction orthogonal to the first direction and the second direction is a third direction, a side on which the window panel is disposed relative to the roof in the third direction is a first side, and a side opposite the first side is a second side, the device attachment structure comprising a base member (10) configured to be attached to a vehicle inner side face of the window panel and support a device (7); a bracket (11) configured to be attached to the roof; and a first cover (12) configured to be attached to the base member and the bracket and cover the device, wherein the base member includes a first engagement portion (41), the bracket includes a second engagement portion (42) and a third engagement portion (43); the first cover includes a fourth engagement portion (44) to be engaged with the first engagement portion, a fifth engagement portion (45) to be engaged with the second engagement portion, and a sixth engagement portion (46) to be engaged with the third engagement portion; the fourth engagement portion is restrained by the first engagement portion from moving in the first direction and the first side in the third direction and is allowed to move in the second direction and toward the second side in the third direction; the sixth engagement portion is restrained by the third engagement portion from moving in the first direction and the third direction and is allowed to move in the second direction; and the fifth engagement portion is restrained by the second engagement portion from moving in the first direction and the third direction and is butted against the second engagement portion in the second direction by an urging member (55) provided between the fifth engagement portion and the second engagement portion.

According to this aspect, it is possible to provide a device attachment structure that is easy to attach to the base member and the roof. When the base member and the bracket are misaligned with each other in the second direction, the misalignment is allowed by the fourth engagement portion moving in the second direction relative to the first engagement portion. When the base member and the bracket are misaligned with each other in the third direction, the misalignment is allowed by the fourth engagement portion moving in the third direction relative to the first engagement portion. The engagement of the second engagement portion and the fifth engagement portion and the engagement of the third engagement portion and the sixth engagement portion determine the position of the first cover relative to the bracket in the first and third directions. Abutting of the second engagement portion and the fifth engagement portion in the second direction determines the position of the first cover relative to the bracket in the second direction.

In the above aspect, the second engagement portion may include a penetration hole (42B) penetrating in the first direction, the fifth engagement portion may extend in the first direction and include a projection piece (45A) to be inserted in the hole, a length in the second direction of the second engagement portion may be longer than a length in the second direction of the fifth engagement portion, the urging member may be connected to one end in the second direction of the fifth engagement portion, and the other end in the second direction of the fifth engagement portion may be provided with an abutting portion (57) abutting on the second engagement portion.

According to this aspect, abutting of the second engagement portion and the fifth engagement portion in the second direction determines the position of the first cover relative to the bracket in the second direction.

In the above aspect, the abutting portion may be a rib extending in the first direction.

According to this aspect, the second engagement portion and the fifth engagement portion can abut on each other more securely.

In the above aspect, the abutting portion may abut on a hole wall of the hole of the second engagement portion.

According to this aspect, the second engagement portion and the fifth engagement portion can abut on each other more securely.

In the above aspect, the urging member may abut on the hole wall of the hole of the second engagement portion.

According to this aspect, the second engagement portion and the fifth engagement portion can abut on each other more securely.

In the above aspect, when the fifth engagement portion abuts on the second engagement portion in the second direction, the sixth engagement portion may be disposed with a space between the sixth engagement portion and the third engagement portion in the second direction.

According to this aspect, abutting of the sixth engagement portion and the third engagement portion in the second direction can be avoided. This allows the second engagement portion and the fifth engagement portion to abut on each other more securely.

Advantages of the Invention

According to the above configuration, it is possible to provide a device attachment structure that is easy to attach to a base member and a roof.

BRIEF DESCRIPTION OF DRAWINGS

FIG. 7 is a sectional view of the device attachment structure (along line VII-VII in FIG. 6).

DESCRIPTION OF EMBODIMENTS

Hereinafter, an embodiment of a device attachment structure of the present invention will be described. The device attachment structure is provided at a boundary between a window panel and a roof of a vehicle. The window panel includes a front window panel defining a front portion of a vehicle compartment, a rear window panel defining a rear portion of the vehicle compartment, and a pair of side window panels defining the right and left sides of the vehicle compartment. It is defined that the up-and-down direction is a first direction, the width direction of the window panel is a second direction, the direction orthogonal to the first and second directions is a third direction, the side on which the window panel is disposed relative to the roof in the third direction is a first side, and the side opposite the first side is a second side.

Figure 1:
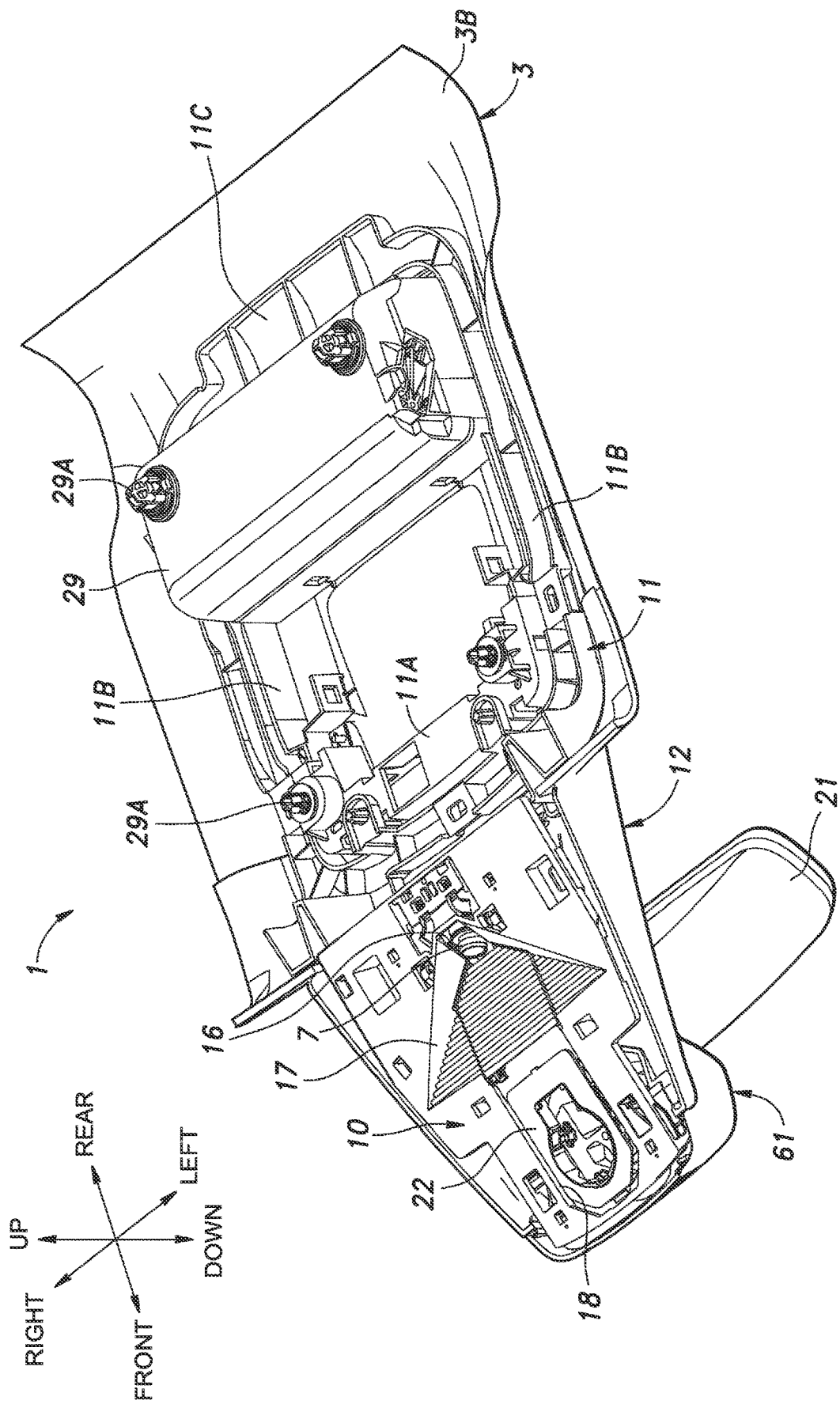
FIG. 1 is a perspective view of a device attachment structure according to an embodiment.
Figure 2:
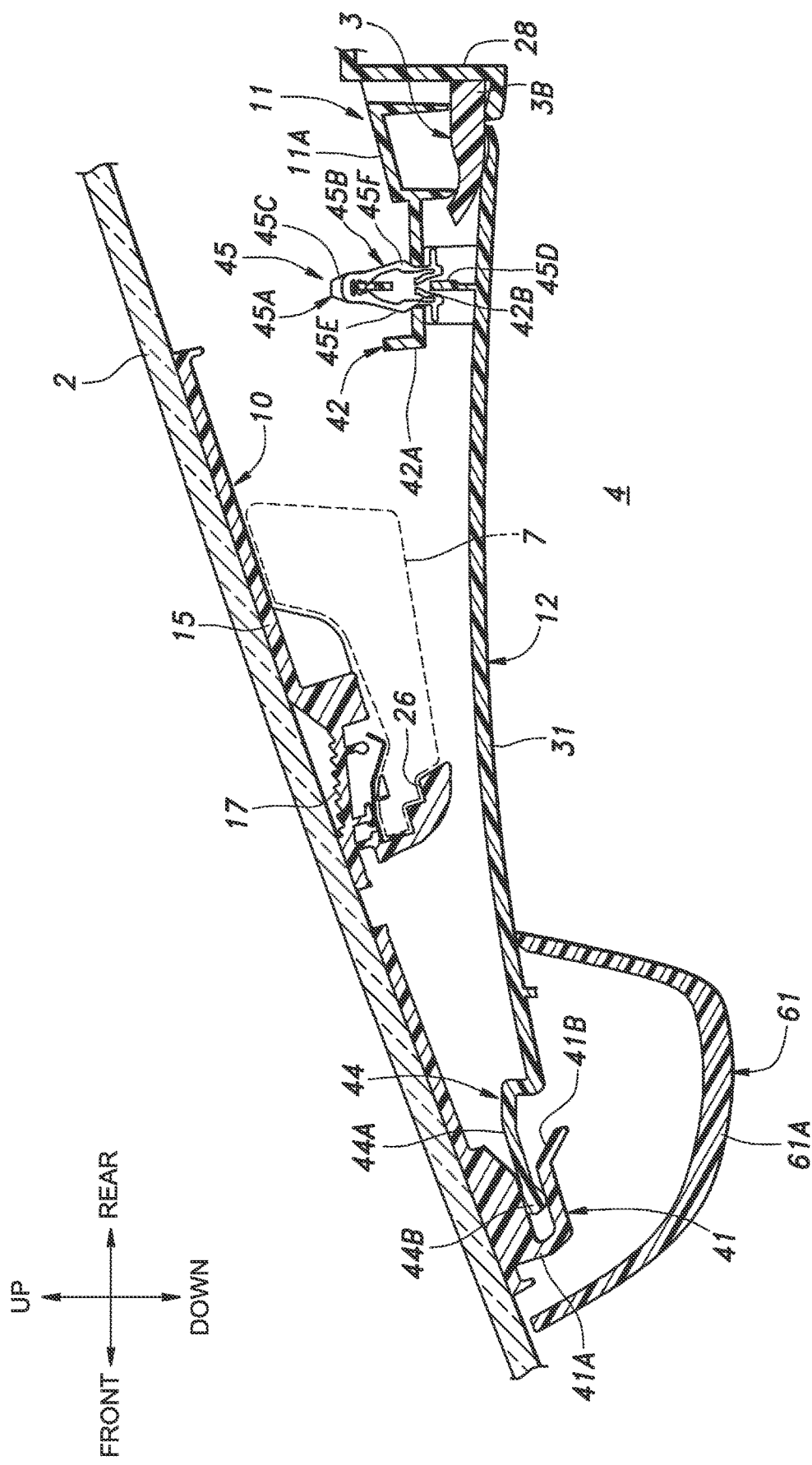
FIG. 2 is a sectional view of the device attachment structure (along line II-II in FIG. 6).

As illustrated in FIGS. 1 and 2, in the present embodiment, the device attachment structure 1 is provided at a boundary between a front window panel 2 and a roof 3. The front window panel 2 is inclined upwardly toward the rear direction. The second direction corresponds to the right-and-left direction, the third direction corresponds to the front-and-rear direction, the first side corresponds to the front side, and the second side corresponds to the rear side. The roof 3 defines an upper portion of a vehicle compartment 4, and is substantially horizontally disposed. The roof 3 includes a roof panel (not illustrated) formed of metal, and a roof lining 3B attached to the lower surface of the roof panel. The window panel is preferably formed of glass or resin.

The device attachment structure 1 includes a base member 10 attached to an upper end portion of a vehicle inner side face (rear surface) of the front window panel 2 and supporting a device 7, a bracket 11 attached to the roof 3, and a first cover 12 attached to the base member 10 and the bracket 11 and covering the device 7. The device 7 is preferably a sensor including a camera, a radar, a lidar, and the like. The base member 10, the bracket 11, and the first cover 12 are preferably formed of resin.

Figure 3:
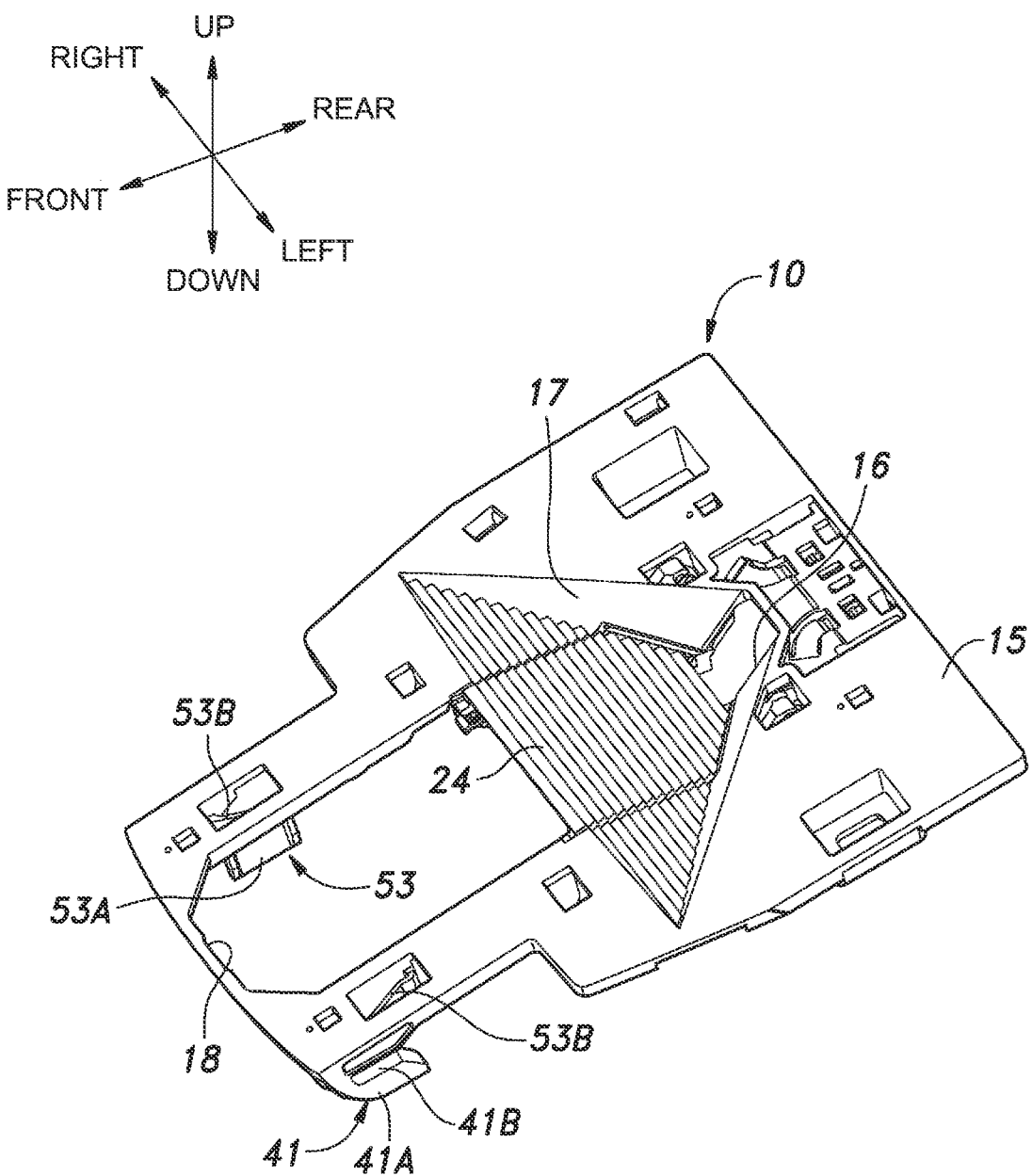
FIG. 3 is a perspective view of a base member.

As illustrated in FIGS. 2 and 3, the base member 10 includes a base main portion 15 including the front surface and the rear surface and formed in a plate shape. The front surface of the base main portion 15 is formed in a flat shape. The front surface of the base main portion 15 is connected to the vehicle inner side face of the front window panel 2 with double-sided tape or an adhesive. The base main portion 15 extends in the up- and down direction along the vehicle inner side face of the front window panel 2. An upper edge of the base main portion 15 extends to right and left and is disposed in the vicinity of an upper edge of the window panel 2.

A through hole 16 penetrating the base main portion 15 from the front surface to the rear surface is formed at the center in the right-and-left direction of an upper portion of the base main portion 15. On the front surface of the base main portion 15, a light guide groove 17 is formed in front of the through hole 16. The light guide groove 17 extends forward from the through hole 16 and gradually increases in width in the right-and-left direction toward the front. The depth of the light guide groove 17 becomes shallower as the light guide groove 17 extends from the through hole 16 toward the front.

As illustrated in FIGS. 1 and 3, a mirror installation hole 18 penetrating the base main portion 15 from the front surface to the rear surface is formed at the center in the right-and-left direction of a lower portion of the base main portion 15. The mirror installation hole 18 is disposed in front of the light guide groove 17. A mirror base 22 is disposed inside the mirror installation hole 18 to support a room mirror 21. The mirror base 22 is connected to the vehicle inner side face of the front window panel 2 with double-sided tape or an adhesive. The mirror base 22 extends downward from the front window panel 2, and then bends and extends rearward. A rear end of the mirror base 22 is provided with the room mirror 21.

In the base member 10, a portion forming a central portion in the right-and-left direction of the light guide groove 17 may be formed by an attachable and detachable additional component 24. Preferably, the additional component 24 is detachably attached to the base member 10 with an elastic claw or the like. In a state where the base member 10 is connected to the front window panel 2, the additional component 24 is attachable to and detachable from the base member 10. Detaching the additional component 24 from the base member 10 makes it possible to clean the inside of the light guide groove 17 and the vehicle inner side face of the front window panel 2. The additional component 24 may be rotatably connected around a shaft line extending from left to right at a front end portion and detachably engaged with the base member 10 at a rear end portion.

As illustrated in FIG. 2, an upper portion of the rear surface of the base member 10 is provided with a device engagement portion 26 to be detachably engaged with the device 7. The device engagement portion 26 is formed by a plurality of elastic claws and engagement grooves 41B. In the present embodiment, the device engagement portion 26 includes a pair of right and left engagement grooves 41B to be engaged with a front end portion of the device 7 and elastic claws to be engaged with a rear end of the device 7. With the device engagement portion 26, the device 7 is attached to the rear surface of the base member 10. If the device 7 is a camera, the lens of the camera is disposed at a position corresponding to the through hole 16 in a state where the device 7 is attached to the rear surface of the base member 10. If the device 7 is a radar or a lidar, a transmission unit and a reception unit thereof are preferably disposed at a position corresponding to the through hole 16.

Figure 5:
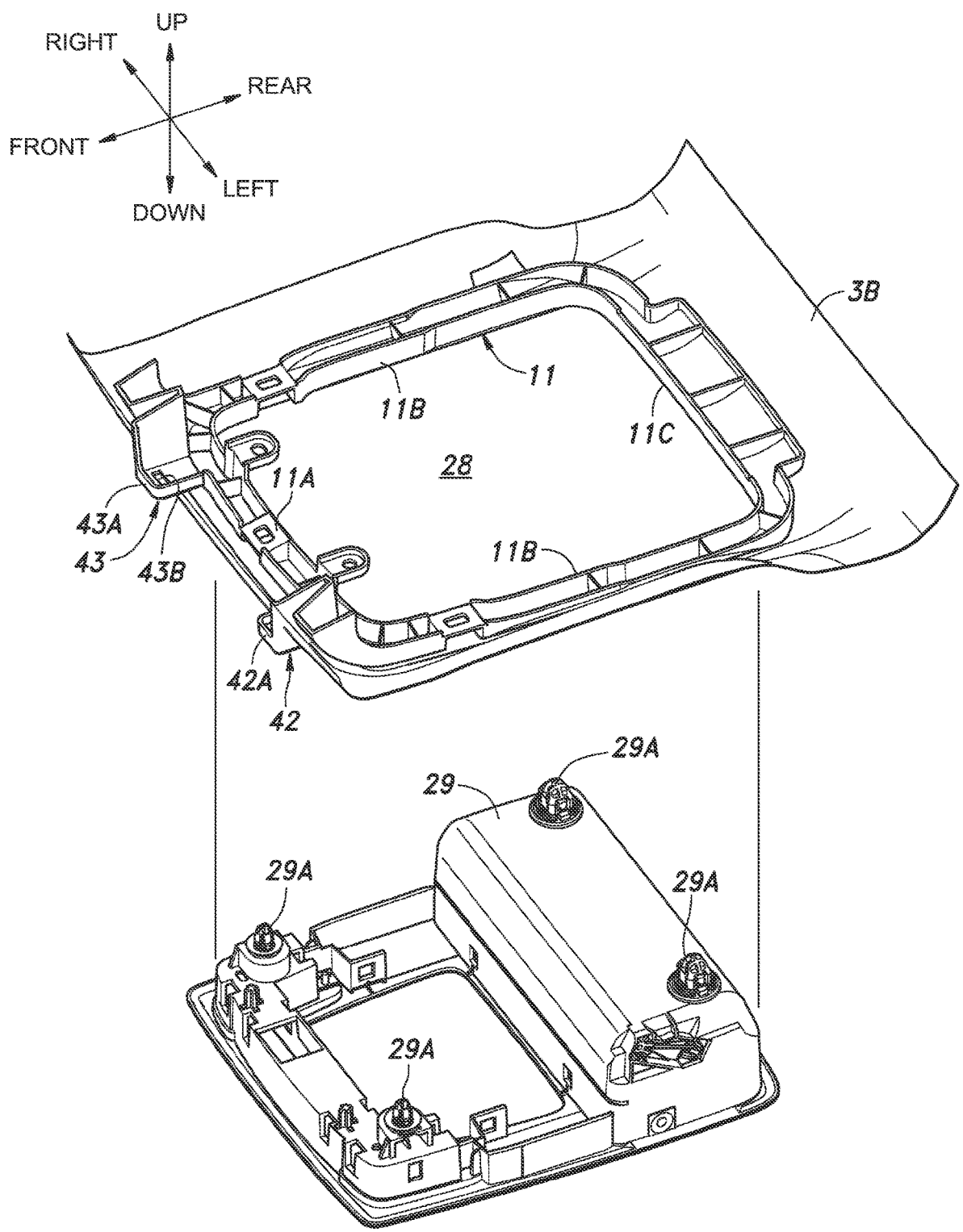
FIG. 5 is an exploded perspective view of a bracket and a roof console.

As illustrated in FIGS. 1, 2, and 5, the bracket 11 is preferably connected to at least one of the roof panel and the roof lining 3B. In the present embodiment, the bracket 11 is provided on the roof lining 3B. The bracket 11 may be formed integrally with the roof lining 3B. The bracket 11 includes a front edge portion 11A extending to right and left, right and left side edge portions 11B extending rearward from respective right and left ends of the front edge portion 11A, and a rear edge portion 11C extending to right and left and connected to each rear end of the right and left side edge portions 11B, forming a square frame shape. The bracket 11 is provided at an edge portion of an attachment hole 28 penetrating in the up-and-down direction through the roof lining 3B. A roof console 29 is disposed inside the bracket 11. The roof console 29 is preferably fastened to the roof panel with fastening members 29A, such as fasteners. The roof console 29 may be an interior light, a display, or the like.

Figure 4:
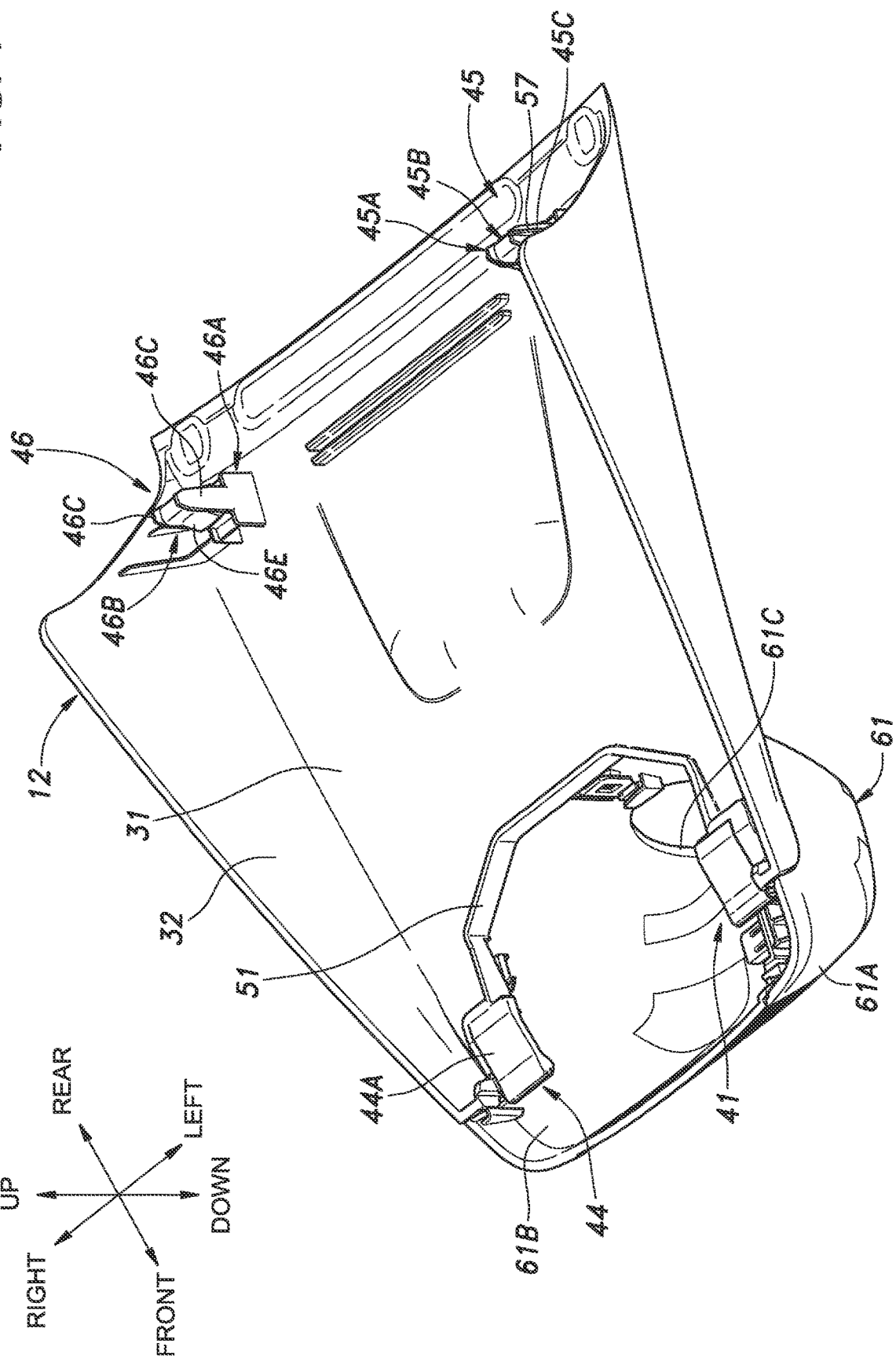
FIG. 4 is a perspective view of a first cover.

As illustrated in FIGS. 1, 2, and 4, the first cover 12 includes a cover main portion 31 formed in a plate shape, and a pair of right and left cover side wall portions 32 provided at each of right and left side edges of the cover main portion 31. In a state where the first cover 12 is attached to the base member 10 and the bracket 11, the cover main portion 31 extends in the front-and-rear direction under the base member 10. The right and left cover side wall portions 32 extend upward from the cover main portion 31. An upper edge of each cover side wall portion 32 is inclined upwardly toward the rear direction, and extends along the vehicle inner side face of the front window panel 2. The first cover 12 is engaged with the base member 10 and the bracket 11 with first to sixth engagement portions 41 to 46.

As illustrated in FIGS. 2 to 7, the base member 10 includes the first engagement portion 41. The bracket 11 includes the second engagement portion 42 and the third engagement portion 43. The first cover 12 includes the fourth engagement portion 44 to be engaged with the first engagement portion 41, the fifth engagement portion 45 to be engaged with the second engagement portion 42, and the sixth engagement portion 46 to be engaged with the third engagement portion 43.

The fourth engagement portion 44 is restrained by the first engagement portion 41 from moving in the up-and-down direction (first direction) and moving toward the front side (first side) in the front-and-rear direction (third direction), and is allowed to move in the right-and-left direction (second direction) and toward the rear side (Second side) in the front-and-rear direction (third direction).

As illustrated in FIGS. 2 and 3, the first engagement portion 41 is provided at a front end portion of the lower surface of the base member 10. The first engagement portion 41 includes right and left first walls 41A projecting from a lower portion of the rear surface of the base member 10, and the right and left engagement grooves 41B depressed from a rear edge to the front side of each first wall 41A and penetrating in the right-and-left direction. The pairs of the first walls 41A and the engagement grooves 41B are disposed at the lower surface of the base member 10, on the right and left of the mirror installation hole 18.

Figure 6:
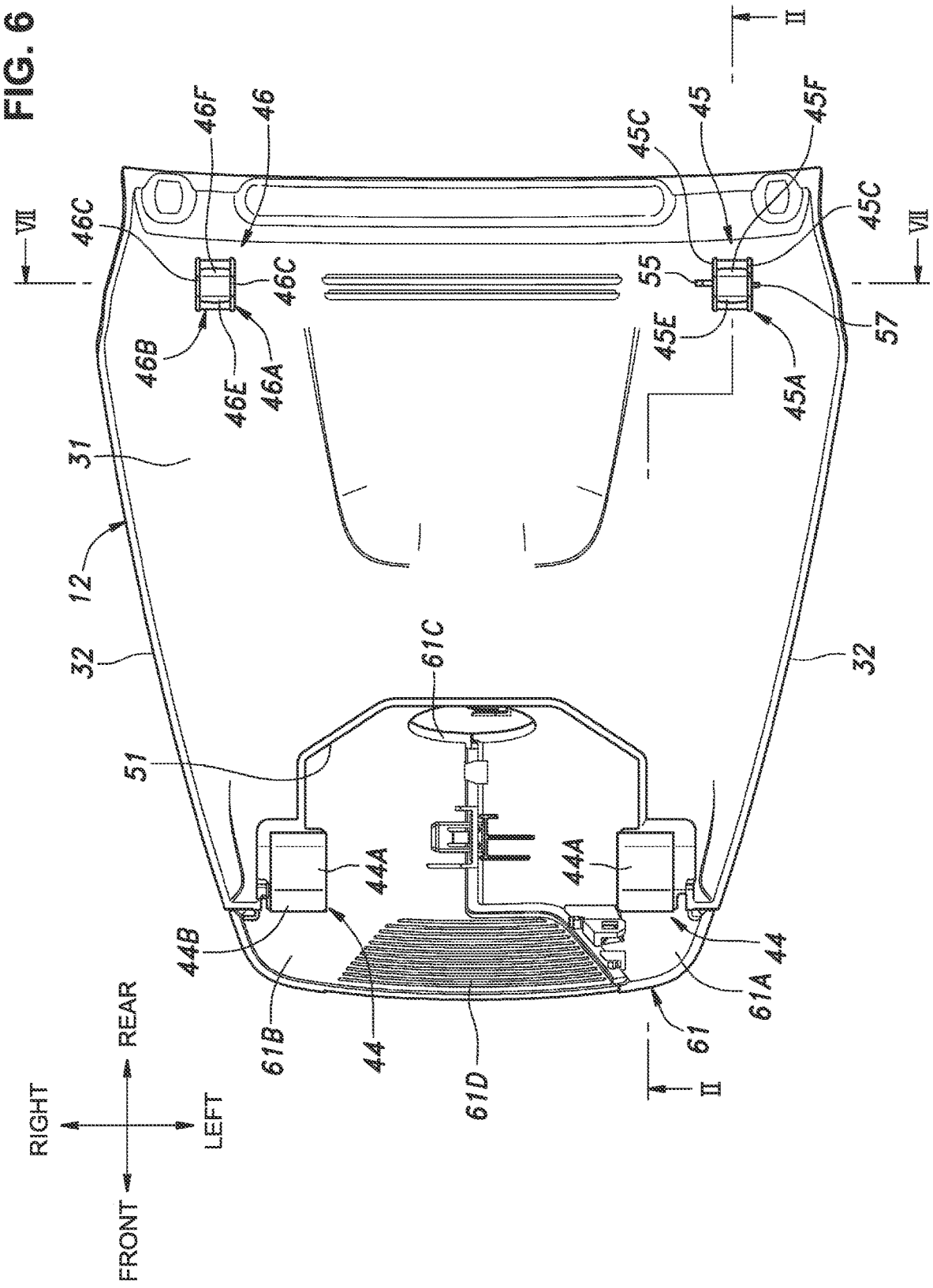
FIG. 6 is a plan view of the first cover.

As illustrated in FIGS. 4 and 6, a concave 51 depressed rearward is formed at the center in the right-and-left direction of a front edge of the first cover 12. The concave 51 penetrates in the thickness direction (up-and-down direction) of the first cover 12. The concave 51 is disposed at the lower side of the mirror installation hole 18. The fourth engagement portion 44 includes right and left tongue pieces 44A provided outside the concave 51 in the right-and-left direction in the front edge of the first cover 12. Each tongue piece 44A is formed in a plate shape and extends forward. A front end 44B of each tongue piece 44A is formed in a cylindrical columnar shape extending in the right-and-left direction. The thickness of the front end 44B in the up-and-down direction is formed thicker than the thickness of other portions of the tongue piece 44A.

Each tongue piece 44A of the fourth engagement portions 44 is received in the corresponding engagement groove 41B of the first engagement portion 41. The right and left tongue pieces 44A are restrained by the right and left engagement grooves 41B from moving in the up-and-down direction and moving toward the front side, and is allowed to move in the right-and-left direction and in the rear direction.

Right and left front urging members 53 are provided inside the respective right and left first walls 41A in the right-and-left direction. Each front urging member 53 includes a second wall 53A projecting downward from the rear surface of the base member 10, and a first elastic piece 53B extending from a rear edge of the second wall 53A to the front side and outward in the right-and-left direction. Each first elastic piece 53B abuts on the corresponding right or left tongue piece 44A from the inside in the right-and-left direction, and urges the tongue piece 44A outward toward the right or left.

As illustrated in FIGS. 4 to 7, the sixth engagement portion 46 is restrained by the third engagement portion 43 from moving in the up-and-down direction (first direction) and the front-and-rear direction (third direction), and is allowed to move in the right-and-left direction (second direction).

The third engagement portion 43 includes a support portion 43A in a plate shape projecting forward from a right portion of the front edge portion 11A of the bracket 11, and a support hole 43B penetrating the support portion 43A in the up-and-down direction (first direction). The support hole 43B is formed in a rectangular shape extending in the right-and-left direction.

A rear edge of the first cover 12 is disposed rearward from an upper edge of the base member 10 and rearward from the front edge portion 11A of the bracket 11. That is, the rear portion of the first cover 12 is disposed at the lower side of the front edge portion 11A of the bracket 11. The sixth engagement portion 46 is provided at the rear right side of the upper surface, which faces the base member 10, of the first cover 12. The sixth engagement portion 46 includes a projection piece 46A projecting upward from the upper surface of the cover main portion 31, and an elastic claw 46B provided at a side portion of the projection piece 46A. The elastic claw 46B is attached to the projection piece 46A.

The projection piece 46A includes a pair of right and left side wall portions 46C, and a connection wall portion 46D connecting the pair of side wall portions 46C. Faces of the side wall portions 46C face in the right-and-left direction, and extend in the front-and-rear direction. Faces of the connection wall portion 46D face in the front-and-rear direction, and extend in the right-and-left direction. In a plain view, the projection piece 46A is formed in an H shape. The elastic claw 46B covers the connection wall portion 46D from the upper side, and is engaged with the connection wall portion 46D. The elastic claw 46B preferably includes a front side piece 46E extending from an upper end of the connection wall portion 46D to the front face side, and a rear side piece 46F extending from the upper end of the connection wall portion 46D to the rear face side. The front side piece 46E and the rear side piece 46F of the elastic claw 46B are engaged with the connection wall portion 46D, and are restrained from moving in the up-and-down direction. The front side piece 46E and the rear side piece 46F of the elastic claw 46B are movable in the front-and-rear direction relative to the connection wall portion 46D by elastic deformation. A middle portion of the front side piece 46E projects forward from front edges of the right and left side wall portions 46C, and the rear side piece 46F projects rearward from rear edges of the right and left side wall portions 46C.

The sixth engagement portion 46 is inserted into the third engagement portion 43. The front edges and the rear edges of the pair of side wall portions 46C of the sixth engagement portion 46 abut on an edge portion of the support hole 43B of the third engagement portion 43. With this configuration, the sixth engagement portion 46 is restrained by the third engagement portion 43 from moving in the front-and-rear direction. Further, the elastic claw 46B on the front and rear of the sixth engagement portion 46 is engaged with an upper edge of the support hole 43B of the third engagement portion 43, and thus the sixth engagement portion 46 is restrained by the third engagement portion 43 from moving in the up-and-down direction. The width in the right-and-left direction of the third engagement portion 43 is formed larger than the width in the right-and-left direction of the sixth engagement portion 46. This allows the sixth engagement portion 46 to move in the right-and-left direction relative to the third engagement portion 43.

The fifth engagement portion 45 is restrained by the second engagement portion 42 from moving in the up-and-down direction (first direction) and the front-and-rear direction (third direction), and is butted against the second engagement portion 42 in the right-and-left direction (second direction) by an urging member 55 provided between the fifth engagement portion 45 and the right-and-left direction (second engagement portion 42).

The second engagement portion 42 is provided at a left portion of the front edge portion 11A of the bracket 11. The second engagement portion 42 includes a support portion 42A in a plate shape projecting forward from the front edge portion 11A, and a support hole 42B penetrating the support portion 42A in the up-and-down direction (first direction). The second engagement portion 42 is formed in a rectangular shape extending in the right-and-left direction. The second engagement portion 42 and the third engagement portion 43 are preferably disposed separately from each other in the right-and-left direction at the front edge portion 11A of the bracket 11.

The fifth engagement portion 45 is provided at the rear left side of the upper surface of the first cover 12. The fifth engagement portion 45 includes a projection piece 45A projecting upward from the upper surface of the cover main portion 31, and an elastic claw 45B provided at a side portion of the projection piece 45A. The elastic claw 45B is attached to the projection piece 45A.

The projection piece 45A includes a pair of right and left side wall portions 45C, and a connection wall portion 45D connecting the pair of side wall portions 45C. Faces of the side wall portions 45C face in the right-and-left direction, and extend in the front-and-rear direction. Faces of the connection wall portion 45D face in the front-and-rear direction, and extend in the right-and-left direction. In a plain view, the projection piece 45A is formed in an H shape. The elastic claw 45B covers the connection wall portion 45D from the upper side, and is engaged with the connection wall portion 45D. The elastic claw 45B preferably includes a front side piece 45E extending from an upper end of the connection wall portion 45D to the front face side, and a rear side piece 45F extending from the upper end of the connection wall portion 45D to the rear face side. The front side piece 45E and the rear side piece 45F of the elastic claw 45B are engaged with the connection wall portion 45D, and are restrained from moving in the up-and-down direction. The front side piece 45E and the rear side piece 45F of the elastic claw 45B are movable in the front-and-rear direction relative to the connection wall portion 45D by elastic deformation. A middle portion of the front side piece 45E projects forward from front edges of the pair of right and left side wall portions 45C. A middle portion of the rear side piece 45F projects rearward from rear edges of the pair of right and left side wall portions 45C.

As illustrated in FIGS. 6 and 7, the urging member 55 is connected to one end in the right-and-left direction (second direction) of the fifth engagement portion 45. The other end in the right-and-left direction (second direction) of the fifth engagement portion 45 is provided with a rib 57, as an abutting portion abutting on the second engagement portion 42. In the present embodiment, the urging member 55 is connected to the side wall portion 45C on the right side of the fifth engagement portion 45. The urging member 55 is preferably an elastic piece extending downward and to the right from an upper end of the side wall portions 45C on the right side. The urging member 55 can be elastically deformed in the right-and-left direction.

The rib 57 projects to the left from the side wall portion 45C on the left side of the fifth engagement portion 45. The rib 57 extends in the up-and-down direction along the left side surface of the side wall portions 45C on the left side.

The fifth engagement portion 45 is inserted into the second engagement portion 42. The front edges and the rear edges of the pair of side wall portions 45C of the fifth engagement portion 45 abut on edge portions of the support hole 42B constituting the second engagement portion 42. With this configuration, the fifth engagement portion 45 is restrained by the second engagement portion 42 from moving in the front-and-rear direction. Further, the elastic claw 45B on the front and rear of the fifth engagement portion 45 is engaged with an upper edge of the support hole 42B constituting the second engagement portion 42, and thus the fifth engagement portion 45 is restrained by the second engagement portion 42 from moving in the up-and-down direction.

The width in the right-and-left direction of the second engagement portion 42 is formed longer than the width in the right-and-left direction of the fifth engagement portion 45 including the pair of side wall portions 45C, the connection wall, and the abutting portion. In a state where the fifth engagement portion 45 is inserted in the second engagement portion 42, the elastic member abuts on a right edge of the support hole 42B of the second engagement portion 42 and urges the projection piece 45A in the left direction relative to the support hole 42B. With this configuration, the rib 57 abuts on a left edge of the support hole 42B, and the position of the projection piece 45A in the right-and-left direction relative to the support hole 42B is determined.

As illustrated in FIGS. 4 and 6, a second cover 61 is attached to a front portion of the first cover 12. The second cover 61 includes a left piece 61A and a right piece 61B, which are connected to each other. Each of the left piece 61A and the right piece 61B is connected to a front end portion of the lower surface of the first cover 12. The second cover 61 bulges downward from the front end portion of the first cover 12. The second cover 61 covers the concave 51 of the first cover 12 and the front end portion of the base member 10. A penetration hole 61C through which the mirror base 22 passes is formed at a rear portion of the second cover 61. A ventilation hole 61D for taking air from the vehicle compartment to the inside of the second cover is formed at a front portion of the second cover 61.

Next, a method for attaching the first cover 12 to the base member 10 and the bracket 11 will be described. First, an operator inserts each tongue piece 44A of the first cover 12 into the corresponding engagement groove 41B from the rear. At this time, the right and left front urging members 53 push the respective tongue pieces 44A outward in the right-and-left direction. This allows the first cover 12 to be generally centered in the right-and-left direction relative to the base member 10.

In a state where the tongue pieces 44A are inserted in the respective engagement grooves 41B, the first cover 12 is rotatable in a predetermined range around the front ends 44B of the tongue pieces 44A, so that a rear end of the first cover 12 can move up and down. Next, the operator moves the rear end of the first cover 12 upward, inserts the projection piece 45A of the fifth engagement portion 45 into the support hole 42B of the second engagement portion 42, and also inserts the projection piece 46A of the sixth engagement portion 46 into the support hole 43B of the third engagement portion 43. With this operation, the elastic claw 45B of the fifth engagement portion 45 is engaged with a hole edge of the support hole 42B of the second engagement portion 42, and the elastic claw 46B of the sixth engagement portion 46 is engaged with a hole edge of the support hole 43B of the third engagement portion 43. This allows the first cover 12 to be attached to the base member 10 and the bracket 11. Then, the left piece 61A and the right piece 61B of the second cover 61 are attached to the first cover 12.

According to the above embodiment, it is possible to provide the device attachment structure 1, which can be easily attached to the base member 10 and the roof 3. When the base member 10 and the bracket 11 are misaligned with each other in the right-and-left direction, the misalignment is allowed by the fourth engagement portion 44 moving in the right-and-left direction relative to the first engagement portion 41. When the base member 10 and the bracket 11 are misaligned with each other in the front-and-rear direction, the misalignment is allowed by the fourth engagement portion 44 moving in the front-and-rear direction relative to the first engagement portion 41. The engagement of the second engagement portion 42 with the fifth engagement portion 45 and the engagement of the third engagement portion 43 with the sixth engagement portion 46 determine the position of the first cover 12 relative to the bracket 11 in the up-and-down direction and the front- and rear direction. Abutting of the second engagement portion 42 and the fifth engagement portion 45 in the right-and-left direction determines the position of the first cover 12 relative to the bracket 11 in the right-and-left direction.

The urging member 55 of the fifth engagement portion 45 abuts on a hole wall of a right end of the support hole 42B of the second engagement portion 42, and thus the projection piece 45A of the fifth engagement portion 45 is urged to the left relative to the support hole 42B and the rib 57 abuts on the hole wall of a left end of the support hole 42B. This determines the position of the first cover 12 in the right- and-left direction relative to the bracket 11. The urging member 55 extends in the up-and-down direction, which is the axis line direction of the support hole 42B, and thus can securely abut on the hole wall of the support hole 42B. Similarly, the rib 57 extends in the up-and-down direction, which is the axis line direction of the support hole 42B, and thus can securely abut on the hole wall of the support hole 42B.

When the rib 57 of the fifth engagement portion 45 abuts on the support hole 43B of the second engagement portion 42 in the right-and-left direction, the projection piece 46A of the sixth engagement portion 46 is disposed with a space between the projection piece 46A and the support hole 42B of the third engagement portion 43 in the right-and-left direction. This allows the rib 57 of the fifth engagement portion 45 to securely abut on the support hole 42B of the second engagement portion 42, whereby the position of the first cover 12 in the right-and-left direction relative to the bracket 11 is determined.

The present invention has been described with a specific embodiment, but the present invention is not limited by the above-described embodiment, and can be modified in various ways. For example, the device attachment structure 1 may be provided at a boundary between another window panel, including a rear window panel and a side window panel, and the roof 3. The configurations of the second engagement portion 42 and the fifth engagement portion 45 may be replaced with each other, or the configurations of the third engagement portion 43 and the sixth engagement portion 46 may also be replaced with each other.

REFERENCE SIGNS LIST

1 Device attachment structure
2 Front window panel
3 Roof
4 Vehicle compartment
7 Device
10 Base member
11 Bracket
12 First cover
15 Base main portion
41 First engagement portion
42 Second engagement portion
42A Support portion
42B Support hole
43 Third engagement portion
43A Support portion
43B Support hole
44 Fourth engagement portion
45 Fifth engagement portion
45A Projection piece
45B Elastic claw
46 Sixth engagement portion
46A Projection piece
46B Elastic claw
53 Front urging member
55 Urging member
57 Rib
61 Second cover

What is claimed is:

1. A device attachment structure provided at a boundary between a window panel and a roof of a vehicle,
wherein an up-and-down direction is a first direction, a width direction of the window panel is a second direction, a direction orthogonal to the first direction and the second direction is a third direction, a side on which the window panel is disposed relative to the roof in the third direction is a first side, and a side opposite to the first side is a second side, the device attachment structure comprising:

a base member configured to be attached to a vehicle inner side face of the window panel and support a device;

a bracket configured to be attached to the roof; and a first cover attached to the base member and the bracket, and covering the device, wherein the base member includes a first engagement portion, the bracket includes a second engagement portion and a third engagement portion, the first cover includes a fourth engagement portion to be engaged with the first engagement portion, a fifth engagement portion to be engaged with the second engagement portion, and a sixth engagement portion to be engaged with the third engagement portion, the fourth engagement portion is restrained by the first engagement portion from moving in the first direction and the first side in the third direction and is allowed to move to the second side in the second direction and the third direction, the sixth engagement portion is restrained by the third engagement portion from moving in the first direction and the third direction and is allowed to move in the second direction, and the fifth engagement portion is restrained by the second engagement portion from moving in the first direction and the third direction and is butted against the second engagement portion in the second direction by an urging member provided between the fifth engagement portion and the second engagement portion.

2. A device attachment structure according to claim 1, wherein the second engagement portion includes a penetration hole penetrating in the first direction, the fifth engagement portion extends in the first direction and includes a projection piece to be inserted in the hole, a length in the second direction of the second engagement portion is larger than a length in the second direction of the fifth engagement portion, the urging member is connected to one end in the second direction of the fifth engagement portion, and another end in the second direction of the fifth engagement portion is provided with an abutting portion abutting on the second engagement portion.

3. A device attachment structure according to claim 2, wherein the abutting portion is a rib extending in the first direction.

4. A device attachment structure according to claim 3, wherein the abutting portion abuts on a hole wall of the hole of the second engagement portion.

5. A device attachment structure according to claim 2, wherein the urging member abuts on a hole wall of the hole of the second engagement portion.

6. A device attachment structure according to claim 1, wherein when the fifth engagement portion abuts on the second engagement portion in the second direction, the sixth engagement portion is disposed with a space between the sixth engagement portion and the third engagement portion in the second direction.

* * * * *